A. H. PILAND.
PLOW.
No. 174,293. Patented Feb. 29, 1876.
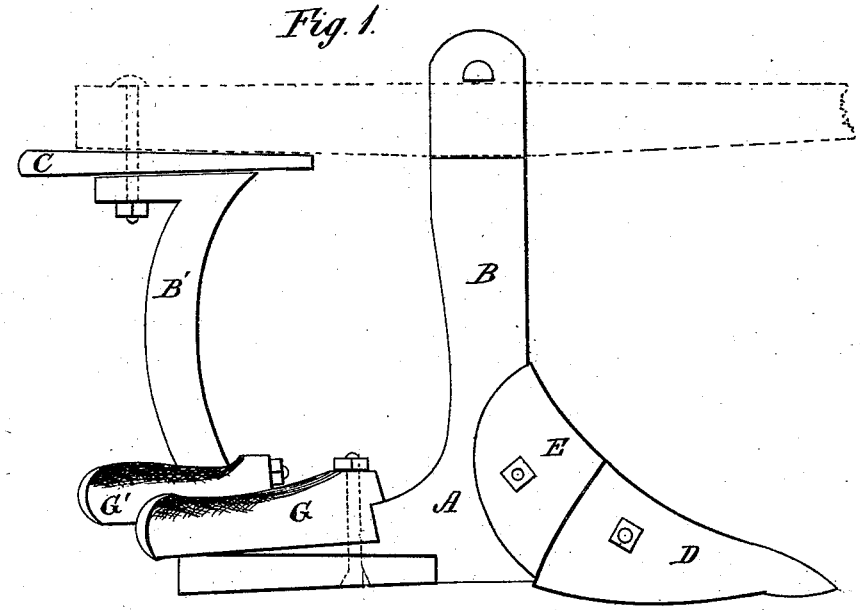
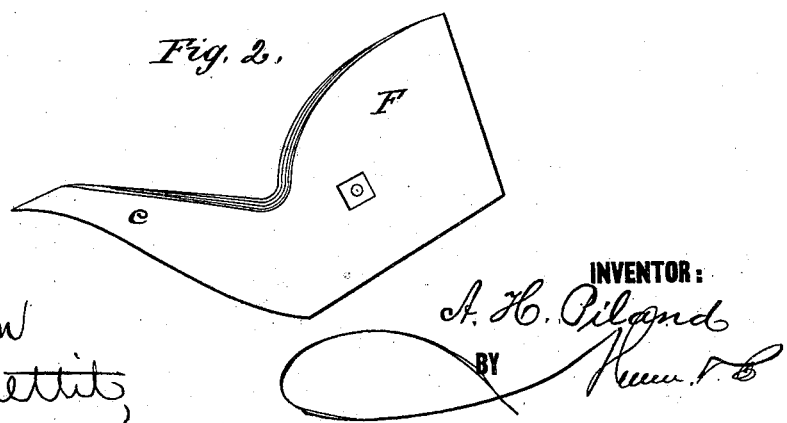
WITNESSES:
INVENTOR:
ATTORNEYS.

UNITED STATES PATENT OFFICE.

ASA H. PILAND, OF MARGARETTSVILLE, NORTH CAROLINA.

IMPROVEMENT IN PLOWS.

Specification forming part of Letters Patent No. 174,293, dated February 29, 1876; application filed January 7, 1876.

*To all whom it may concern:*

Be it known that I, ASA HARREL PILAND, of Margarettsville, in the county of Northampton and State of North Carolina, have invented a new and Improved Plow; and I do hereby declare that the following is a full, clear, and exact description of the same, reference being had to the accompanying drawing, forming a part of this specification, in which—

Figure 1 is a side view of a plow to which my invention is applicable; Fig. 2, a view of my combined mold-board and sweep or bat-wing, constituting my invention.

This invention relates to certain improvements in plows of that class in which one or more detachable sweeps are employed, for the cultivation of cotton and corn in the earlier stages of its growth; and it consists in the peculiar construction of a combined mold-board and sweep or bat-wing, made in a single piece, and adapted to be used as hereinafter described.

In the drawing, A represents the skeleton or frame of a plow, cast in one piece, with two branches, B B', the first of which is tenoned so as to pass through a mortise in the plow-beam and be secured thereto by a bolt or key, and the second rear branch, B', is secured to the beam by a vertical bolt, a slotted wedge-block, C, being interposed between the end of the branch B' and the bottom of the beam. The object of this wedge is to vary the inclination of the beam to the earth so as to cause the plow to run deep or shallow, as may be desired. D is a duck-bill point, which is attached to the front end of the skeleton by means of bolts or screws, and made with an angular ridge in the center, so as to break the hard ground and make the point self-clearing. E are front wings, fastened to the skeleton upon each side above the point, so as to constitute a double-turning plow, a portion of the dirt falling over the top of the same so as to leave the furrow with a plenty of loose earth in it. The said wings E are detachably bolted to the skeleton, so that they may be readily removed to receive and accommodate the bat-wing F or combined mold-board and sweep, which constitutes my invention. This bat-wing F is intended to be used in the place of the wings E and the two sweeps G G', which are placed one above the other between the branches of the skeleton-frame, and when thus substituted for the wings E performs the function of both wings and sweeps, and are especially adapted to the cultivation of cotton and corn when the plants are young.

I am aware of the fact that sweeps have been attached to the mold-boards of plows in a variety of ways so as to be removable, but the point of connection is weak by reason of the bolt-holes, and the great leverage which the sweep affords is liable to break the narrow blades at these points. I therefore confine my invention to the bat-wing, or the combined mold-board and sweep made in one piece, whereby the plow is enabled to stand much greater service and harder strains without requiring repairs.

Having thus described my invention, what I claim as new is—

The combined mold-board and sweep or bat-wing, consisting of the mold-board portion F, provided with the extension c, cast in one and the same piece, substantially as described.

ASA HARREL $\overset{\text{his}}{\times}$ PILAND.
<div style="text-align:center">mark.</div>

Witnesses:
   E. A. CARR,
   E. C. HARIF.